United States Patent [19]
Orain

[11] 3,745,789
[45] July 17, 1973

[54] AXIALLY FIXED HOMOKINETIC COUPLING WITH LIMITED TRANSVERSE FREEDOM OF MOVEMENT

[75] Inventor: Michel Orain, Conflans-Sainte-Honorine, France

[73] Assignee: Societe Anonyme: Glaenzer Spicer, Poissy, France

[22] Filed: Oct. 18, 1971

[21] Appl. No.: 190,338

[30] Foreign Application Priority Data
Nov. 6, 1970 France .............................. 7040066

[52] U.S. Cl. .................................................. 64/21
[51] Int. Cl. ............................................. F16d 3/30
[58] Field of Search ........................................ 64/21

[56] References Cited
UNITED STATES PATENTS

| | | | |
|---|---|---|---|
| 3,332,256 | 7/1967 | Mazziotti | 64/21 |
| 2,293,717 | 8/1942 | Dodge | 64/21 |
| 2,235,002 | 3/1941 | Anderson | 64/21 |
| 3,613,396 | 10/1971 | Drevard et al. | 64/21 |

Primary Examiner—Charles J. Myhre
Assistant Examiner—Randall Heald
Attorney—Donald M. Wight et al.

[57] ABSTRACT

An axially fixed homokinetic coupling with limited transverse freedom of movement. The coupling essentially comprises a constant velocity three-arm star-type coupling with rollers mounted on a first shaft. The rollers are mounted for rolling movement in pairs of grooves formed in a socket fixed to a second shaft. A retaining member prevents the axial movement of the coupling and includes a sleeve surrounding the first shaft and a spherical collar. The spherical collar cooperates with a spherical portion of a casing secured to the socket. The concave free end of the first shaft is received in a convex part. A spring disposed between the closed end of the socket and the convex part maintains the convex part in cooperation with the concave free end of the first shaft and maintains the spherical part of the casing is very close overlying relationship with the spherical collar of the retaining member to effect a fluidtight seal therebetween. The assembly enables transverse displacement of the shafts to compensate for slight differences in their alignment.

4 Claims, 3 Drawing Figures

AXIALLY FIXED HOMOKINETIC COUPLING WITH LIMITED TRANSVERSE FREEDOM OF MOVEMENT

The present invention concerns an axially fixed homokinetic coupling formed by means of a coupling with three arms carrying rollers rolling in pairs of grooves formed in the socket portion of the coupling and fixed to the driving shaft. As used therein, the expression "fixed homokinetic coupling" designates a coupling of this kind which is fixed in its axial position.

It is known that in front wheel drive vehicles it is necessary to use a coupling assembly comprising an axially fixed coupling and a sliding coupling, the fixed coupling being generally positioned near the wheel.

In vehicles with independent rear whell drive, it is necessary to insert between the rear differential and each one of the rear wheels a double pivot coupling device which is freely axially slidable but nevertheless limiting the path of their sliding shaft to a predetermined value by various means such as specially shaping the grooves of the ball joint or a complex system of steps in the first coupling and thrust springs in the second coupling.

The problem posed may be solved by using couplings adapted to both the fixed and sliding condition.

But it has been practically judged preferable for reasons of manufacture to use similar component parts adapted for assembling sliding couplings and, as set forth above to join one of the two couplings of coupling assembly, a retaining means preventing the axial displacement of the shaft of this coupling.

The main object of the invention is therefore to provide a constant velocity coupling by means of a coupling with three arms of a known type, slidable by definition, but no longer being able to slide while using the component parts conventionally used for couplings of this type, owing to additional members permitting the sliding shaft to be fixed in position but leaving the coupling transverse freedom of movement limited in a way so as to compensate for the slight displacement due to the three arm coupling (called tripod) technique in the plane thereof.

The coupling according to the present invention essentially comprises the conventional parts of a constant velocity coupling of the star type keyed to one of the driving shafts and having three arms provided with rolls in the pairs of linear grooves formed in a socket portion fixed to the other driving shaft, as well as a retaining member formed as a sleeve provided with a spherical collar and with the first driving shaft extending therethrough, the retaining member co-operating with a spherical casing fixed to the socket portion and with a concave part maintained in contact with a convex portion of the star, or another member fixed thereto, by a spring bearing against the closed end of the socket portion, this co-operation enabling the axial fixing of the coupling and the movement of the shaft relative to the second shaft as well as a slight transverse freedom of movement adapted to absorb slight differences of alignment of the two shafts by means of the spring acting against said concave part.

The coupling thus formed may be completed with a bellows connecting the shaft carrying the star with the spherical casing for assuring the fluidtightness of the coupling. But this fluidtightness may be effected by the adjustment of the members in contact capable of protecting the coupling against the introduction of dust and other materials.

The coupling according to the invention may be used in combination with an identical or different coupling. The coupling then being mounted on one end of the driving shaft whereas the other end of the shaft carries any type of fixed or sliding coupling.

Embodiments of the coupling are described hereinafter by way of example and for illustration purpose only with reference to the accompanying drawings in which.

Figure 3:
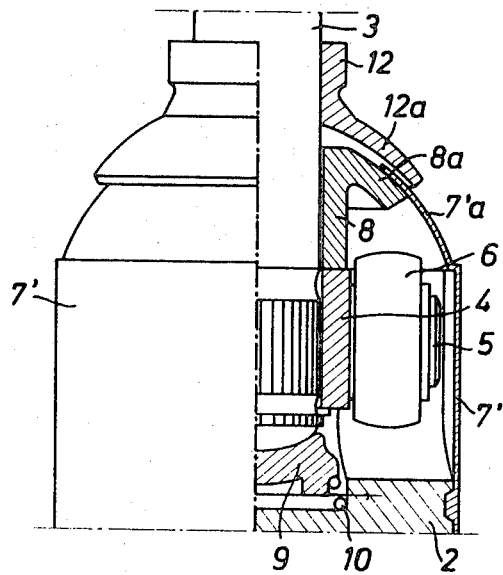

FIG. 3 also shows a partial view of a second alternative embodiment.

Figure 1:
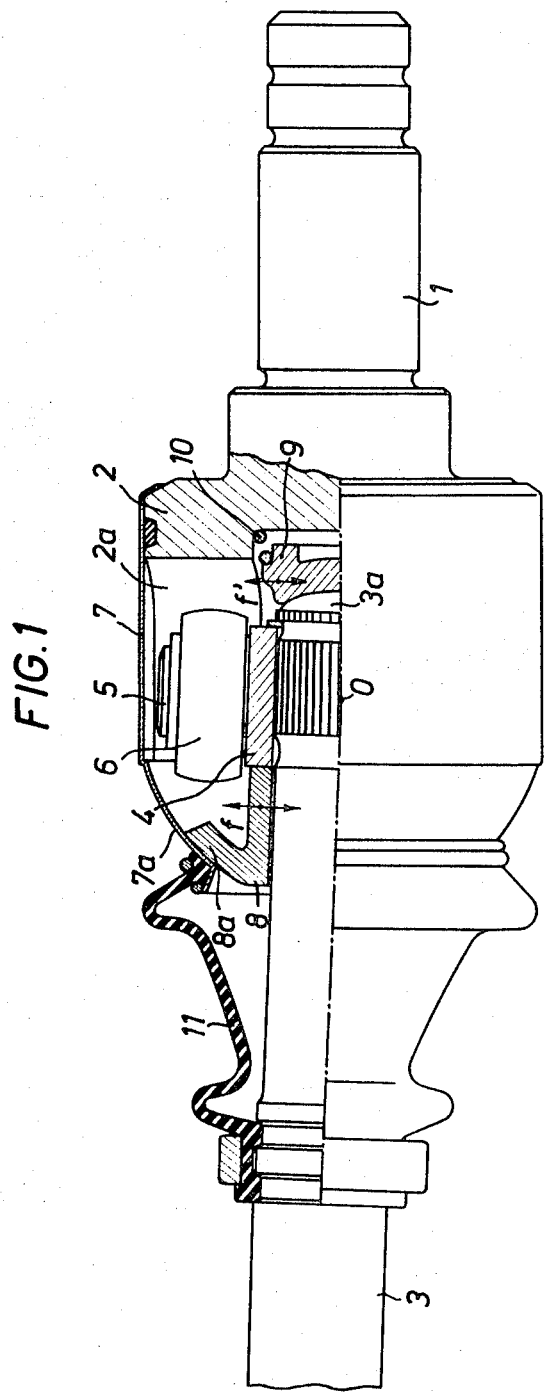
FIG. 1 shows the coupling half in section.

In the embodiment shown in FIG. 1, the coupling according to the invention comprises the conventional members, i.e., a shaft 1 coming from the differential and fixed with a socket portion 2 in which are formed three pairs of grooves $2a$ which provide three corresponding rolling paths and a star 4 mounted on a driving or connecting shaft 3, said star being known as a "tripod" having three arms 5, each having a roller 6 adapted to roll in one of the grooves $2a$ of the socket portion 2. This assembly constitutes a classic sliding coupling.

The main of the invention is to transform this sliding coupling into a fixed coupling enabling the axis of the shaft 3 to pivot at the point 0 located at the centre of the star 4 and disposed on the axis of the shaft 1 without being displaceable along this axis.

The result is obtained by means of a casing 7 fixed on the socket portion 2 and ending in a spherical portion $7a$ having its centre at the point 0 and on which a retaining member 8 of synthetic or other material may slide. This part 8 has the shape of a sleeve with a spherical collar or flange $8a$, this assembly prevents the sliding of the shaft 3 which passes through the part 8.

In order to axially fix the shaft 3 the part 8 cooperates with a force applying part 9 having a concave seat receiving the convex end $3a$ of the shaft or any othe convex portion formed on a part fixed to the star 4.

The part 9 is constantly maintained in contact with the shaft 3 by a spring 10 bearing against the closed end of the socket portion.

It is understood straight away that the parts of generally spherical shape may have limited transverse freedom along the direction of the arrows $f$ and $f'$ in order to compensate the very slight displacement which may be produced between the two shafts.

The coupling so constructed is completed by a fluidtight bellows 11 fixed to the casing 7 and the shaft 3 in any known manner.

The opposite end of the connecting shaft 3 is fixed to the three arm star or tripod of a second homokinetic sliding coupling of the same or other type but does not comprise means for the securing its tripod in the socket portion, which in this case is fixed to the end of the axle of the wheel hub.

Of course the semi-fixed coupling may be also positioned on the wheel side, the sliding coupling being position on the differential side.

In the embodiment which has just been described the fluidtightness of the coupling of the shafts may be completed by the bellows 11, but it may be noted that the retaining member with the spherical collar 8a formed of synthetic material, for example, is capable of assuring a sufficient fluidtightness of the coupling by bearing against the spherical portion 7a of the casing 7 and against the body of the star 4.

Figure 2:
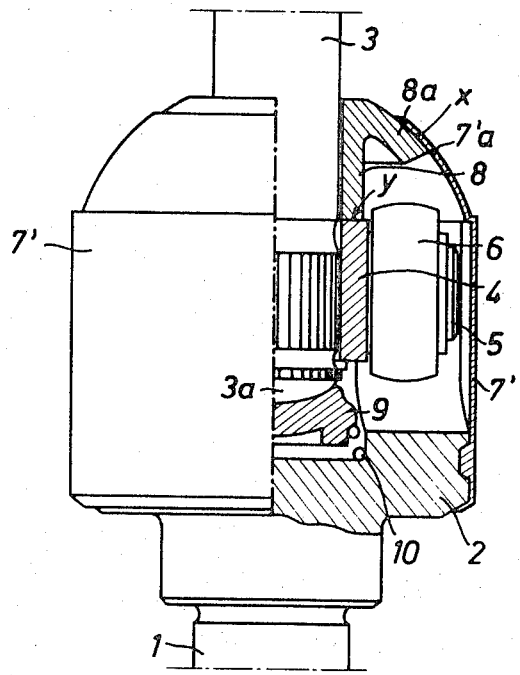
FIG. 2 shows an alternative embodiment of the coupling.

FIG. 2 shows an simplified alternative embodiment taking this into consideration.

In this embodiment the casing 7 does not include a upstanding flange and retains its spherical shape along the entire portion 7a co-operating with the retaining member 8 provided on the shaft 3 and bearing against the body ot the star 4. The portion 7'a of the casing thus remains in constant contact with the spherical collar 8a of the retaining member 8, this contact being assured by the spring 10 acting against the concave part 9 acting on the spherical end 3a of the shaft 3 or on a spherical member fixed to the latter.

It is also clearly seen that the contact surfaces x and y are capable of assuring the desirable fluidtightness although the parts under consideration may move relative to one another because of their function in the coupling.

However, if it is desired to eliminate abrasive dust from the surface of the parts, it is possible, as shown in FIG. 3, to add a sealing member 12 having a tubular portion slid onto the shaft 3 and a spherical portion 12a in or out of contact with the domed portion 7'a of the casing 7.

I claim:

1. An axially fixed homokinetic coupling with limited transverse freedom of movement comprising a constant velocity three-arm start-type coupling provided with rollers and mounted on a first shaft for rotation therewith, said rollers being received in linear grooves formed in a socket portion on a second shaft, a retaining member including a sleeve portion positioned about the first shaft and a spherical collar, a part-spherical casing fixed to the socket portion and in cooperative engagement with the spherical collar of the retaining member for preventing separation of said shafts, a force applying part having a concave portion fixed for movement with the first shaft, said shaft carrying a convex portion in contact with said concave portion, and spring means extending between and bearing on the closed end of the socket portion and said force applying part for maintaining the concave portion in cooperative engagement with the convex portion and the spherical collar in cooperative engagement with the spherical part of the casing.

2. A coupling according to claim 1, wherein the spherical portion of the casing is constantly maintained in very close overlying relationship with the spherical collar thereby effecting a fluidtight seal therebetween.

3. A coupling according to claim 1, further comprising a sealing member for protecting contact surfaces of the coupling.

4. A coupling according to claim 1, wherein one of the shafts is a wheel axle of a second axially slidable homokinetic coupling for joining the wheel hub to the differential.

* * * * *